(12) United States Patent
Togawa et al.

(10) Patent No.: US 10,741,198 B2
(45) Date of Patent: Aug. 11, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Taro Togawa, Kawasaki (JP); Sayuri Nakayama, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 16/035,153

(22) Filed: Jul. 13, 2018

(65) Prior Publication Data

US 2019/0027165 A1 Jan. 24, 2019

(30) Foreign Application Priority Data

Jul. 18, 2017 (JP) .................................. 2017-139228

(51) Int. Cl.
*G10L 25/00* (2013.01)
*G10L 25/87* (2013.01)
(Continued)

(52) U.S. Cl.
CPC ............ *G10L 25/87* (2013.01); *G10L 15/222* (2013.01); *G10L 17/02* (2013.01); *G10L 21/02* (2013.01);
(Continued)

(58) Field of Classification Search
CPC ................................. H04R 3/005; G10L 25/00
See application file for complete search history.

(56) References Cited

U.S. PATENT DOCUMENTS 5,317,567 A * 5/1994 Champion ............ H04M 3/568
370/267
5,737,405 A * 4/1998 Dezonno ................. H04M 3/36
379/189

(Continued)

FOREIGN PATENT DOCUMENTS

JP 2002-278547 9/2002
JP 2006-209332 8/2006

(Continued)

OTHER PUBLICATIONS

Kofi Boakye et al: "Overlapped Speech Detection for Improved Speaker Diarization in Multiparty Meetings", Acoustics, Speech and Signal Processing, 2008. ICASSP 2008. IEEE International Conference on, IEEE, Piscataway, NJ, USA, pp. 4353-4356, Mar. 31, 2008. Cited in EESR dated Nov. 30, 2018 for corresponding European Patent Application No. 18183373.2.

(Continued)

*Primary Examiner* — Daniel Abebe
(74) *Attorney, Agent, or Firm* — Fujitsu Patent Center

(57) ABSTRACT

An information processing apparatus includes a memory, and a processor coupled to the memory and configured to specify a first signal level of a first voice signal, specify a second signal level of a second voice signal, and execute evaluation of at least one of the first voice signal and the second voice signal based on at least one of a sum of the first signal level and the second signal level and an average of the first signal level and the second signal level.

17 Claims, 15 Drawing Sheets

(51) Int. Cl.
  *G10L 15/22* (2006.01)
  *G10L 17/02* (2013.01)
  *G10L 21/02* (2013.01)
  *G10L 25/60* (2013.01)
  *G10L 25/84* (2013.01)
  *G10L 25/78* (2013.01)

(52) U.S. Cl.
  CPC .............. *G10L 25/60* (2013.01); *G10L 25/84* (2013.01); *G10L 25/78* (2013.01); *G10L 2025/783* (2013.01)

(56) References Cited

U.S. PATENT DOCUMENTS

| | | | |
|---|---|---|---|
| 7,881,234 B2* | 2/2011 | Abernethy, Jr. | H04M 3/42221 370/260 |
| 8,897,437 B1 | 11/2014 | Tan et al. | |
| 9,767,826 B2* | 9/2017 | Matheja | H04R 3/005 |
| 2002/0172372 A1 | 11/2002 | Tagawa et al. | |
| 2004/0017309 A1* | 1/2004 | Bortnyk | H04B 7/0857 342/189 |
| 2005/0104770 A1* | 5/2005 | Bortnyk | H04B 7/0857 342/189 |
| 2007/0067159 A1 | 3/2007 | Basu et al. | |
| 2016/0217791 A1 | 7/2016 | Togawa et al. | |
| 2016/0232920 A1* | 8/2016 | Matheja | H04R 3/005 |
| 2017/0061989 A1 | 3/2017 | Dow et al. | |

FOREIGN PATENT DOCUMENTS

| | | |
|---|---|---|
| JP | 2011-254342 | 12/2011 |
| JP | 2016-133774 | 7/2016 |

OTHER PUBLICATIONS

EESR—Extended European Search Report dated Nov. 30, 2018 for corresponding European Patent Application No. 18183373.2.

* cited by examiner

FIG. 3

| CONTINUATION TIME LENGTH (CL) | EVALUATION RESULT |
|---|---|
| 0 TO 2 SECONDS | NORMAL |
| 2 TO 4 SECONDS | RATHER BAD |
| 4 SECONDS OR LONGER | SIGNIFICANTLY BAD |

FIG. 7

| FREQUENCY R(i) | EVALUATION RESULT |
|---|---|
| EQUAL TO OR HIGHER THAN X1 AND LOWER THAN X2 | NORMAL |
| EQUAL TO OR HIGHER THAN X2 AND LOWER THAN X3 | RATHER BAD |
| EQUAL TO OR HIGHER THAN X3 | SIGNIFICANTLY BAD |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-139228, filed on Jul. 18, 2017, the entire contents of which are incorporated herein by reference.

FIELD

The embodiments discussed herein are related to an information processing apparatus, a method and a non-transitory computer-readable storage medium.

BACKGROUND

In the recent conventional technology, the impression of conversation is evaluated from voice of speakers to support execution of smooth communication.

FIG. 14 is a diagram for description of an exemplary conventional technology. The following describes an example in which the impression of conversation speaker A and speaker B is evaluated. As illustrated in FIG. 14, a device 10 according to the conventional technology includes speech interval detection units 11a and 11b, an overlapping time calculation unit 12, and a determination unit 13.

The speech interval detection unit 11a is a processing unit configured to detect the interval of speech of speaker A from voice of speaker A. The speech interval detection unit 11a outputs information on the speech interval of speaker A to the overlapping time calculation unit 12.

The speech interval detection unit 11b is a processing unit configured to detect the interval of speech of speaker B from voice of speaker B. The speech interval detection unit 11b outputs information on the speech interval of speaker B to the overlapping time calculation unit 12.

The overlapping time calculation unit 12 is a processing unit configured to calculate an overlapping time between the speech interval of speaker A and the speech interval of speaker B. FIG. 15 is a diagram for description of processing at the overlapping time calculation unit. As illustrated in FIG. 15, when the speech interval of speaker A extends from $T_{a1}$ to $T_{a2}$ and the speech interval of speaker B extends from $T_{b1}$ to $T_{b2}$, the overlapping time is $T_{b2}-T_{b1}$. The overlapping time calculation unit 12 outputs information on the overlapping time to the determination unit 13.

The determination unit 13 is a processing unit configured to evaluate conversation between speakers A and B based on the overlapping time. For example, when the overlapping time is equal to or longer than a predetermined time, the determination unit 13 evaluates that the speech of speaker A is interrupted by speaker B or the speech of speaker B is interrupted by speaker A. A citation list includes Japanese Laid-open Patent Publication Nos. 2016-133774, 2006-209332, 2011-254342, and 2002-278547, U.S. Patent Application Publication No. 2016/0217791 and 2002/0172372.

SUMMARY

According to an aspect of the invention, an information processing apparatus includes a memory, and a processor coupled to the memory and configured to specify a first signal level of a first voice signal, specify a second signal level of a second voice signal, and execute evaluation of at least one of the first voice signal and the second voice signal based on at least one of a sum of the first signal level and the second signal level and an average of the first signal level and the second signal level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary evaluation table according to Embodiment 1;

FIG. 7 is a diagram illustrating an exemplary evaluation table according to Embodiment 2;

DESCRIPTION OF EMBODIMENTS

The conventional technology described above is unable to evaluate conversational impression related to interruption.

For example, when speakers A and B simultaneously speak, speaker B tends to have impression that speech of speaker B is interrupted, as the voice of speaker A is larger.

When feeling that their conversation is interrupted while making long speech, people are likely to speak an important interval as part of the speech, such as a word or a phrase, with particularly large voice. For example, in an interval in which the voice of speaker A is large while speakers A and B simultaneously speak, speaker A tends to have impression that speech of speaker A is interrupted.

It is difficult to detect the above-described conversational impression related to interruption by comparing an overlapping time with a threshold as in the conventional technology.

Embodiment 1

Figure 1:
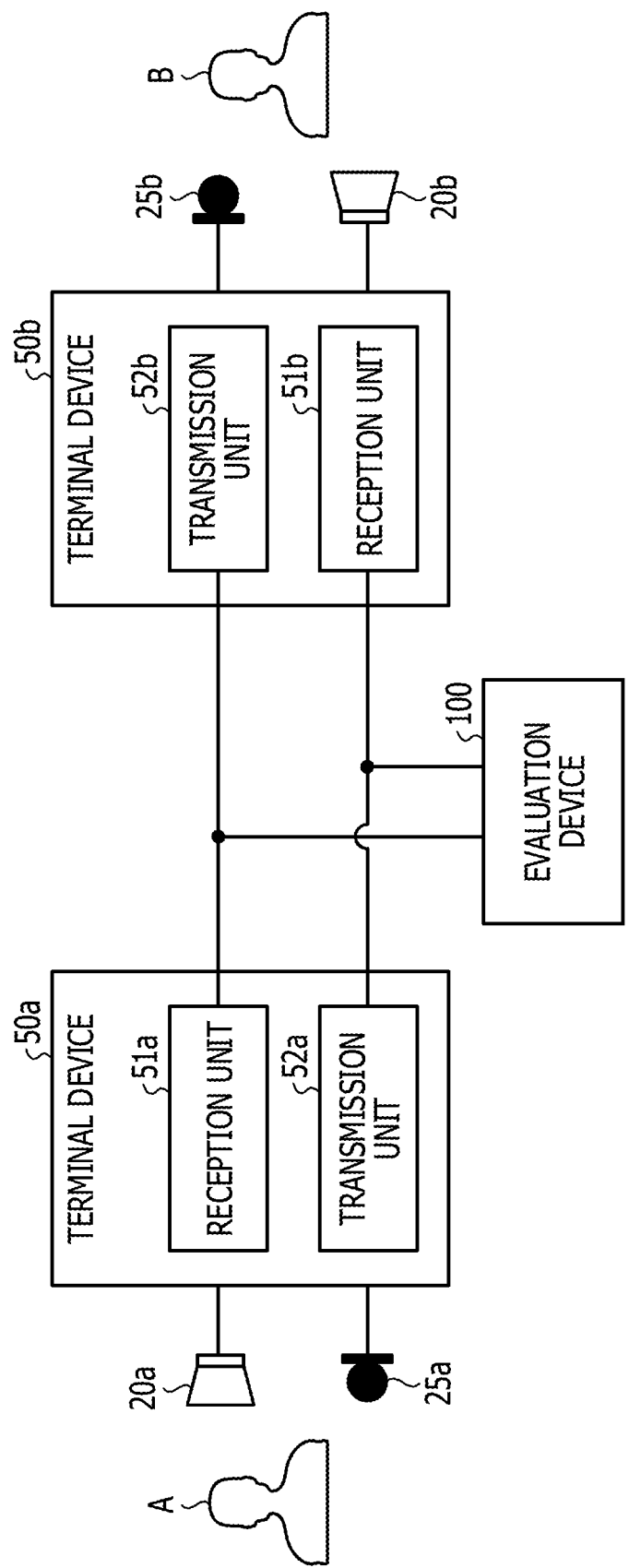
FIG. 1 is a diagram illustrating an exemplary system according to Embodiment 1.

FIG. 1 is a diagram illustrating an exemplary system according to Embodiment 1. As illustrated in FIG. 1, this system includes a terminal device 50a, a terminal device 50b, and an evaluation device 100. The terminal device 50a, the terminal device 50b, and the evaluation device 100 are mutually coupled.

The terminal device 50a is a terminal device used by speaker A when performing conversation with speaker B. The terminal device 50a is coupled with a speaker 20a and a microphone 25a. The terminal device 50a includes a reception unit 51a and a transmission unit 52a.

The reception unit 51a is a processing unit configured to receive a voice signal of speaker B from the terminal device 50b. The reception unit 51a outputs voice of speaker B by outputting the voice signal of speaker B to the speaker 20a.

The transmission unit 52a is a processing unit configured to acquire a voice signal of speaker A collected by the microphone 25a and output the acquired voice signal of speaker A to the terminal device 50b.

The terminal device 50b is a terminal device used by speaker B when performing conversation with speaker A. The terminal device 50b is coupled with a speaker 20b and a microphone 25b. The terminal device 50b includes a reception unit 51b and a transmission unit 52b.

The reception unit 51b is a processing unit configured to receive a voice signal of speaker A from the terminal device 50a. The reception unit 51b outputs voice of speaker A by outputting the voice signal of speaker A to the speaker 20b.

The transmission unit 52b is a processing unit configured to acquire a voice signal of speaker B collected by the microphone 25b and output the acquired voice signal of speaker B to the terminal device 50a.

In the following description, a voice signal of speaker A is referred to as a "first voice signal", and a voice signal of speaker B is referred to as a "second voice signal".

The evaluation device 100 is a device configured to acquire the first voice signal and the second voice signal and evaluate impression of conversation between speakers A and B based on the first and second voice signals.

Figure 2:
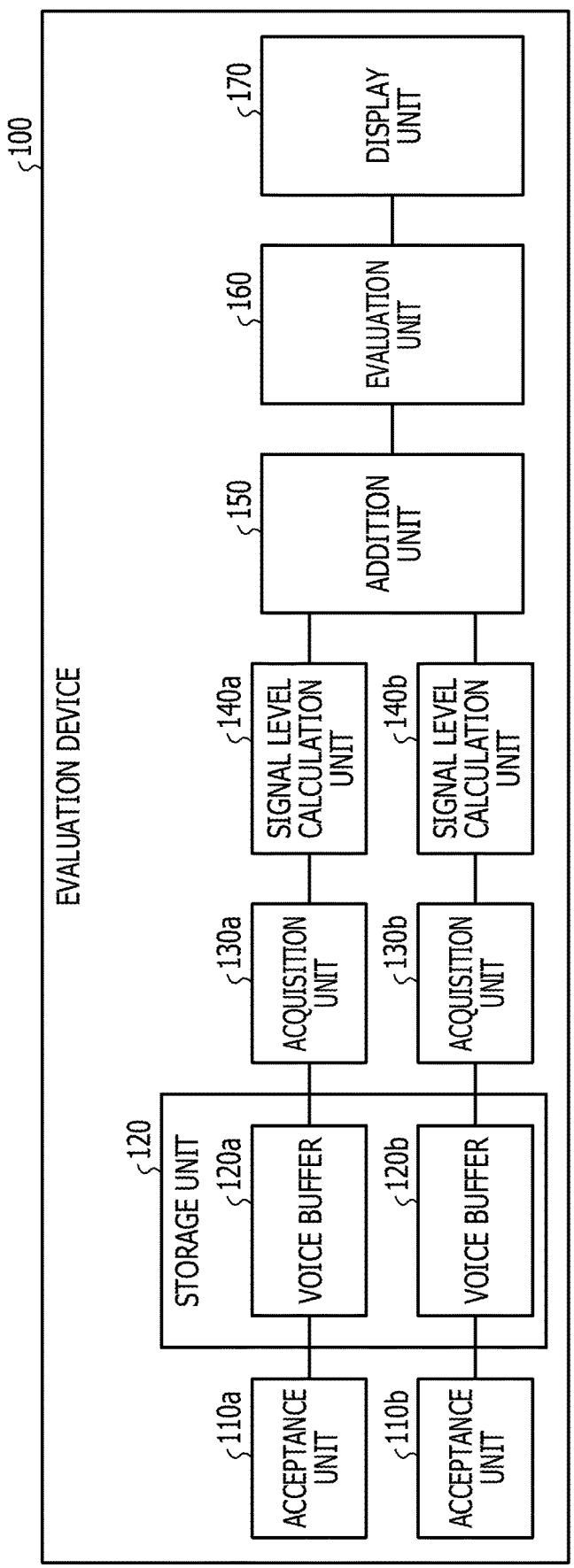
FIG. 2 is a functional block diagram illustrating the configuration of an evaluation device according to Embodiment 1.

FIG. 2 is a functional block diagram illustrating the configuration of the evaluation device according to Embodiment 1. As illustrated in FIG. 2, this evaluation device 100 includes acceptance units 110a and 110b, a storage unit 120, acquisition units 130a and 130b, and signal level calculation units 140a and 140b. The evaluation device 100 includes an addition unit 150, an evaluation unit 160, and a display unit 170.

The acceptance unit 110a is a processing unit configured to accept the first voice signal from the terminal device 50a. The acceptance unit 110a registers the first voice signal to a voice buffer 120a of the storage unit 120.

The acceptance unit 110b is a processing unit configured to accept the second voice signal from the terminal device 50b. The acceptance unit 110b registers the second voice signal to a voice buffer 120b of the storage unit 120.

The storage unit 120 includes the voice buffer 120a and the voice buffer 120b. The storage unit 120 corresponds to a semiconductor memory element such as a random access memory (RAM), a read only memory (ROM), or a flash memory, or a storage device such as a hard disk drive (HDD).

The voice buffer 120a is a buffer configured to store the first voice signal. The voice buffer 120b is a buffer configured to store the second voice signal.

The acquisition unit 130a is a processing unit configured to acquire the first voice signal stored in the voice buffer 120a and output the acquired first voice signal to the signal level calculation unit 140a.

The acquisition unit 130b is a processing unit configured to acquire the second voice signal stored in the voice buffer 120b and output the acquired second voice signal to the signal level calculation unit 140b.

The signal level calculation unit 140a is a processing unit configured to calculate the power of the first voice signal. For example, the signal level calculation unit 140a is a processing unit configured to divide the first voice signal into a plurality of frames each having a predetermined length and calculate a power $S_1(n)$ for each frame. The signal level calculation unit 140a outputs the power $S_1(n)$ to the addition unit 150.

For example, the signal level calculation unit 140a calculates the power $S_1(n)$ based on Expression (1). In Expression (1), $C_1(t)$ represents the value of the first voice signal at time t, n represents the frame number, and M represents the time length of one frame. For example, the time length of one frame is 20 ms.

[Math 1]

$$S_1(n) = 10\log_{10}\left(\sum_{t=n*M}^{(n+1)*M-1} C_1(t)^2\right) \quad (1)$$

The signal level calculation unit 140a may temporally smooth the power $S_1(n)$ by using a predetermined smoothing coefficient, and output the temporally smoothed power $S_1(n)$ to the addition unit 150.

The signal level calculation unit 140b is a processing unit configured to calculate the power of the second voice signal. For example, the signal level calculation unit 140b is a processing unit configured to divide the second voice signal into a plurality of frames each having a predetermined length and calculate a power $S_2(n)$ for each frame. The signal level calculation unit 140b outputs the power $S_2(n)$ to the addition unit 150.

For example, the signal level calculation unit 140b calculates the power $S_2(n)$ based on Expression (2). In Expression (2), $C_2(t)$ represents the value of the second voice signal at time t, n represents the frame number, and M represents the time length of one frame. For example, the time length of one frame is 20 ms.

[Math 2]

$$S_2(n) = 10\log_{10}\left(\sum_{t=n*M}^{(n+1)*M-1} C_2(t)^2\right) \quad (2)$$

The signal level calculation unit 140b may temporally smooth the power $S_2(n)$ by using a predetermined smoothing coefficient, and output the temporally smoothed power $S_2(n)$ to the addition unit 150.

The addition unit 150 is a processing unit configured to add the power of the first voice signal $S_1(n)$ and the power of the second voice signal $S_2(n)$. For example, the addition unit 150 calculates a sum S(n) of each frame based on Expression (3). The addition unit 150 outputs the sum S(n) to the evaluation unit 160.

$$S(n)=S_1(n)+S_2(n) \quad (3)$$

The evaluation unit 160 is a processing unit configured to specify a continuation time in which the sum S(n) exceeds a threshold TH1, and evaluate impression of the first voice signal or the second voice signal based on the specified continuation time. The evaluation unit 160 outputs a result of the evaluation to the display unit 170. The following describes exemplary processing at the evaluation unit 160.

The evaluation unit 160 calculates a start frame Ts at which the sum S(n) exceeds the threshold TH1. For example, the evaluation unit 160 specifies the frame number n of a frame satisfying Condition 1 below and sets the specified frame number n to the start frame Ts. The threshold TH1 is 20 dB.

$$\{S(n-1) \leq TH1\} \wedge \{S(n) > TH1\} \quad \text{(Condition 1)}$$

After having specified the start frame Ts, the evaluation unit 160 calculates an end frame Te at which the sum S(n) becomes equal to or smaller than the threshold TH1. For example, the evaluation unit 160 specifies the frame number n of a frame satisfying Condition 2, and sets the frame number n−1 to the end frame Te.

$$\{S(n-1) > TH1\} \wedge \{S(n) \leq TH1\} \quad \text{(Condition 2)}$$

The evaluation unit 160 calculates a continuation time CL based on the difference between the start frame Ts and the end frame Te. For example, the evaluation unit 160 calculates the continuation time CL based on Expression (4).

$$\text{Continuation time } CL=Te-Ts \quad (4)$$

The evaluation unit 160 evaluates the impression of speech of speaker A by comparing the continuation time CL with a predetermined threshold. For example, the evaluation unit 160 evaluates the impression of speech of speaker A by using an evaluation table. Alternatively, the evaluation unit 160 may calculate a ratio of the powers of the first and second voice signals and specify a speaker as an evaluation target based on the ratio. For example, when the ratio is higher for the power of the first voice signal corresponding to speaker A, the impression of speech may be evaluated for speaker A.

FIG. 3 is a diagram illustrating an exemplary evaluation table according to Embodiment 1. As illustrated in FIG. 3, the evaluation unit 160 evaluates the impression of speech of speaker A to be "normal" when the length (CL) of the continuation time is "equal to or longer than zero second and less than two seconds". The evaluation unit 160 evaluates the impression of speech of speaker A to be "rather bad" when the length (CL) of the continuation time is "equal to or longer than two seconds and less than four seconds". The evaluation unit 160 evaluates the impression of speech of speaker A to be "significantly bad" when the length (CL) of the continuation time is "equal to or longer than four seconds".

Lengths of the continuation time in the evaluation table illustrated in FIG. 3 are exemplary and may be updated by an administrator as appropriate. The evaluation unit 160 may evaluate the impression of speech of speaker B in the same manner that for speaker A.

The display unit 170 is a display device configured to display a result of evaluation by the evaluation unit 160. For example, the display unit 170 corresponds to a liquid crystal display or a touch panel.

For example, the acceptance units 110a and 110b, the acquisition units 130a and 130b, the signal level calculation units 140a and 140b, and the addition unit 150, the evaluation unit 160 correspond to a control unit. The control unit may be achieved by, for example, a central processing unit (CPU) or a micro processing unit (MPU). Alternatively, the control unit may be achieved by a hard wired logic such as an application specific integrated circuit (ASIC) or a field programmable gate array (FPGA).

Figure 4:
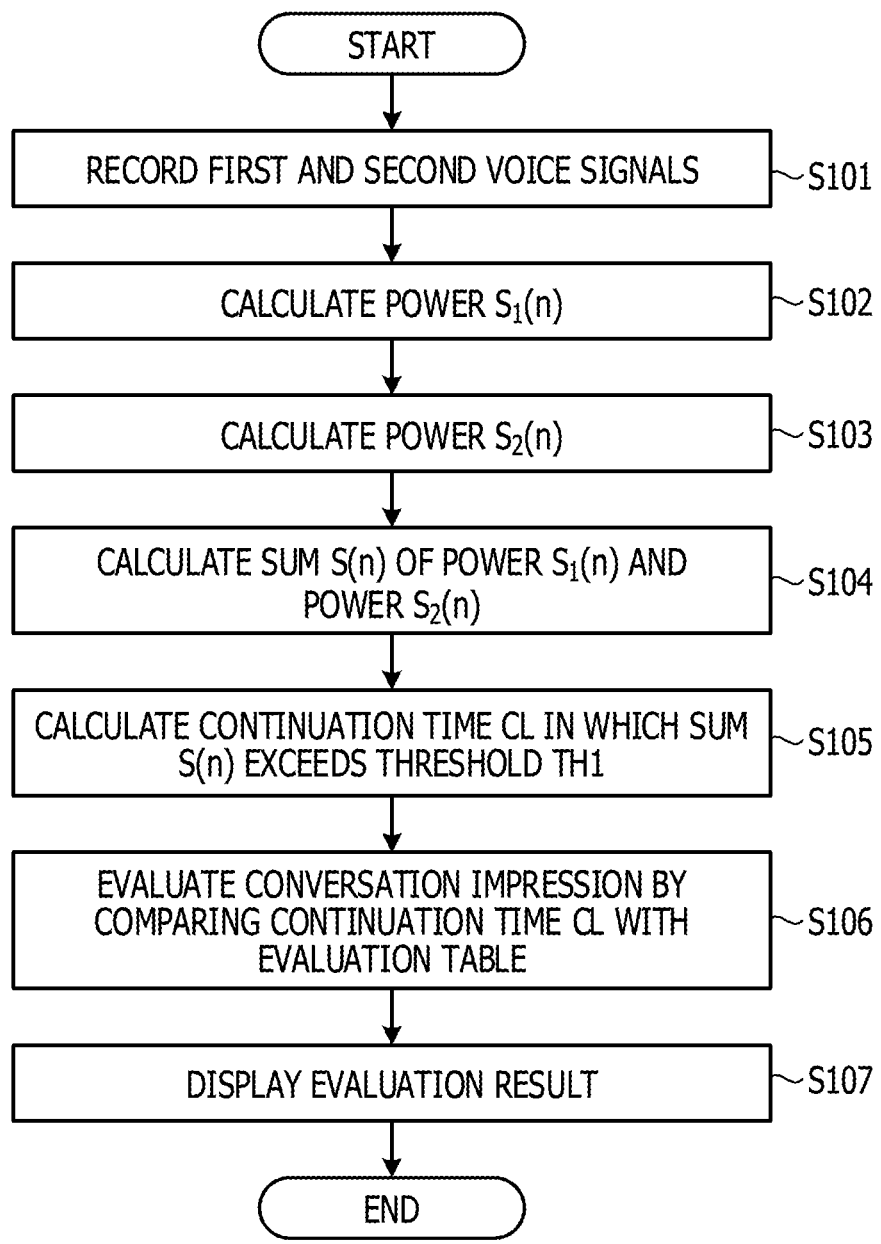
FIG. 4 is a flowchart illustrating the procedure of processing at the evaluation device according to Embodiment 1.

The following describes an exemplary procedure of processing at the evaluation device 100 according to Embodiment 1. FIG. 4 is a flowchart illustrating the procedure of processing at the evaluation device according to Embodiment 1. As illustrated in FIG. 4, the acceptance units 110a and 110b of the evaluation device 100 record the first and second voice signals in the voice buffers 120a and 120b of the storage unit 120 (step S101).

The signal level calculation unit 140a of the evaluation device 100 calculates the power $S_1(n)$ (step S102). The signal level calculation unit 140b of the evaluation device 100 calculates the power $S_2(n)$ (step S103).

The addition unit 150 of the evaluation device 100 calculates the sum S(n) of the power $S_1(n)$ and the power $S_2(n)$ (step S104). The evaluation unit 160 of the evaluation device 100 calculates the continuation time CL in which the sum S(n) exceeds the threshold TH1 (step S105).

The evaluation unit 160 evaluates the impression of conversation by speaker A (or speaker B) by comparing the continuation time CL with the evaluation table (step S106). The display unit 170 of the evaluation device 100 displays a result of the evaluation (step S107).

The following describes effects achieved by the evaluation device 100 according to Embodiment 1. The evaluation device 100 specifies the continuation time CL in which the sum S(n) of the power of the first voice signal $S_1(n)$ and the power of the second voice signal $S_2(n)$ exceeds the threshold TH1, and evaluates the impression of the conversation based on the continuation time CL. Accordingly, the impression of the conversation is accurately evaluated. Impression provided by interruption is correlated with the sum of the magnitudes of voice of speakers A and speaker B. It is possible to evaluate that the impression of the conversation is bad, for example, when the voice of one of the speakers is large and the voice of the other speaker is small but a time in which the sum of the magnitudes exceeds the threshold TH1 is long. The evaluation device 100 is capable of detecting such evaluation.

The addition unit 150 may calculate an average S'(n) by dividing the sum S(n) by two. In such a case, the evaluation unit 160 specifies a continuation time in which the average S'(n) exceeds a threshold TH1', and evaluates the impression of the first voice signal or the second voice signal based on the specified continuation time.

The evaluation device 100 may further execute processing described below. For example, when speakers A and B simultaneously speak, speaker B tends to have impression that speech of speaker B is interrupted, as the voice of speaker A is larger. Thus, when comparison between the continuation time CL and the evaluation table determines impression to be "rather bad or significantly bad", the evaluation unit 160 may distinguish which of speakers A and speaker B provides bad impression based on the magnitude relation between the first and second voice signals. For example, when the first voice signal is larger than the second voice signal, the evaluation unit 160 evaluates that speaker A provides bad impression. When the second voice signal is larger than the first voice signal, the evaluation unit 160 evaluates that speaker B provides bad impression.

Embodiment 2

Figure 5:
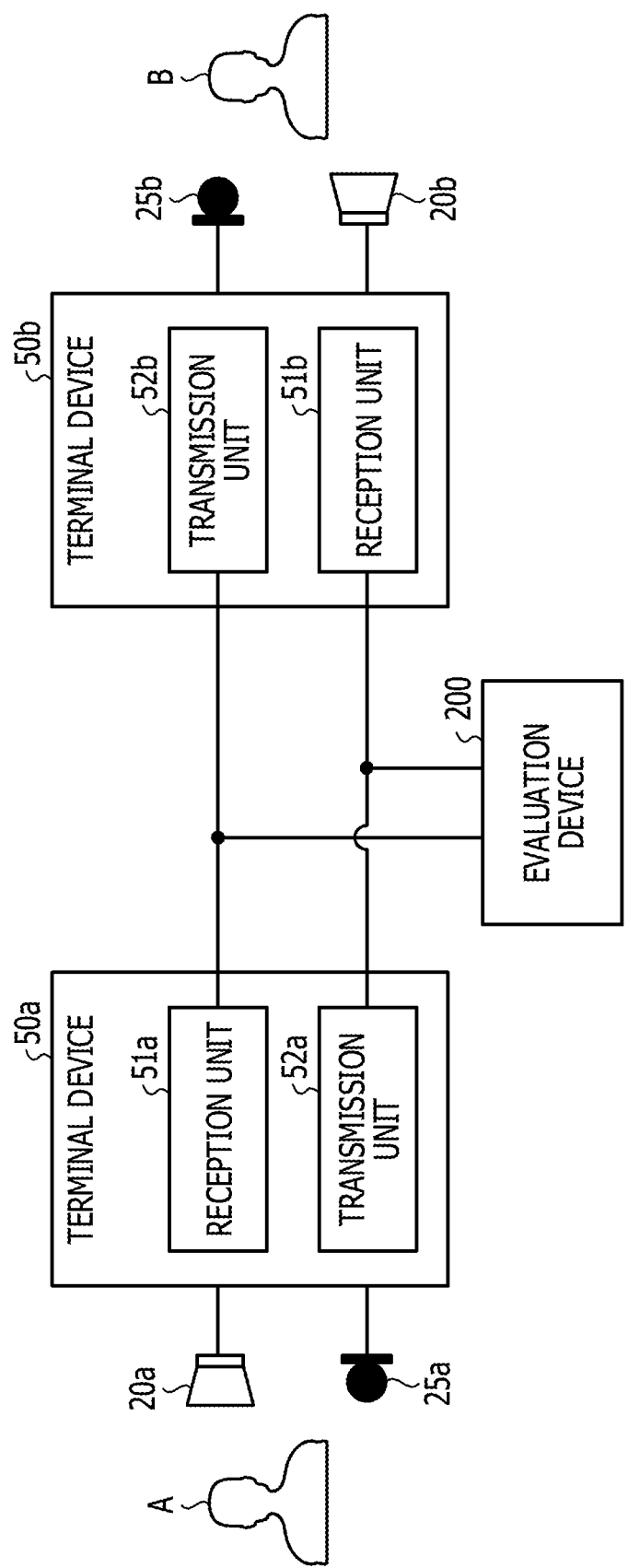
FIG. 5 is a diagram illustrating an exemplary system according to Embodiment 2.

FIG. 5 is a diagram illustrating an exemplary system according to Embodiment 2. As illustrated in FIG. 5, this system includes the terminal device 50a, the terminal device 50b, and an evaluation device 200. The terminal device 50a, the terminal device 50b, and the evaluation device 200 are mutually coupled.

Description of the terminal devices 50a and 50b is same as that of the terminal devices 50a and 50b in Embodiment 1.

The evaluation device 200 is a device configured to acquire the first and second voice signals and evaluate the impression of conversation between speakers A and B based on the first and second voice signals.

Figure 6:
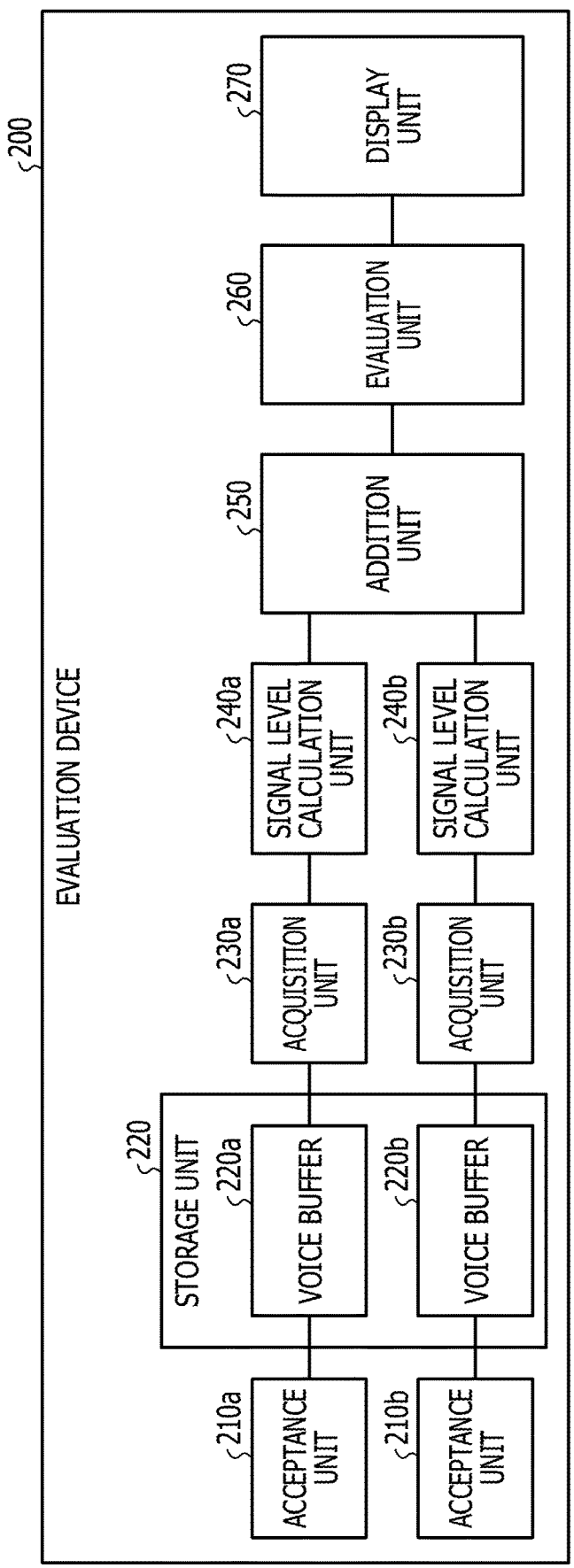
FIG. 6 is a functional block diagram illustrating the configuration of an evaluation device according to Embodiment 2.

FIG. 6 is a functional block diagram illustrating the configuration of the evaluation device according to Embodiment 2. As illustrated in FIG. 6, this evaluation device 200 includes acceptance units 210a and 210b, a storage unit 220, acquisition units 230a and 230b, and signal level calculation units 240a and 240b. The evaluation device 200 includes an addition unit 250, an evaluation unit 260, and a display unit 270.

The acceptance unit 210a is a processing unit configured to accept the first voice signal from the terminal device 50a. The acceptance unit 210a registers the first voice signal to a voice buffer 220a of the storage unit 220.

The acceptance unit 210b is a processing unit configured to accept the second voice signal from the terminal device 50b. The acceptance unit 210b registers the second voice signal to a voice buffer 220b of the storage unit 220.

The storage unit 220 includes the voice buffer 220a and the voice buffer 220b. The storage unit 220 corresponds to a semiconductor memory element such as a RAM, a ROM, or a flash memory, or a storage device such as a HDD.

The voice buffer 220a is a buffer configured to store the first voice signal. The voice buffer 220b is a buffer configured to store the second voice signal.

The acquisition unit 230a is a processing unit configured to acquire the first voice signal stored in the voice buffer 220a and output the acquired first voice signal to the signal level calculation unit 240a.

The acquisition unit 230b is a processing unit configured to acquire the second voice signal stored in the voice buffer 220b and output the acquired second voice signal to the signal level calculation unit 240b.

The signal level calculation unit 240a is a processing unit configured to calculate the signal to noise ratio (SNR) of the first voice signal. The following describes exemplary processing at the signal level calculation unit 240a.

The signal level calculation unit 240a divides the first voice signal into a plurality of frames each having a predetermined length, and calculates the power $S_1(n)$ for each frame. Similarly to the signal level calculation unit 140a, the signal level calculation unit 240a calculates the power $S_1(n)$ based on Expression (1).

The signal level calculation unit 240a determines the existence of a speech interval based on the power $S_1(n)$. For example, when Condition 3 is satisfied, the signal level calculation unit 240a determines that speech exists in the n-th frame. When Condition 3 is not satisfied, the signal level calculation unit 240a determines that no speech exists in the n-th frame.

$$S_1(n) > TH1 \tag{Condition 3}$$

The signal level calculation unit 240a updates a noise level $N_1(n)$ based on the existence of speech. Specifically, when speech exists, the signal level calculation unit 240a updates the noise level $N_1(n)$ based on Expression (5). When no speech exists, the signal level calculation unit 240a updates the noise level $N_1(n)$ based on Expression (6). In Expression (5), $COF_1$ represents a forgetting coefficient for calculating a long-term power average. For example, $COF_1$ is "0.9". The use of the forgetting coefficient allows the long-term power average of a frame with no speech to be calculated as a noise level.

$$N_1(n) = N_1(n-1) \times COF_1 + S_1(n) \times (1 - COF_1) \tag{5}$$

$$N_1(n) = N_1(n-1) \tag{6}$$

The signal level calculation unit 240a calculates $SNR_1(n)$ from the difference between the power $S_1(n)$ and the noise level $N_1(n)$. Specifically, the signal level calculation unit 240a calculates $SNR_1(n)$ based on Expression (7). The signal level calculation unit 240a outputs $SNR_1(n)$ to the addition unit 250.

$$SNR_1(n) = S_1(n) - N_1(n) \tag{7}$$

The signal level calculation unit 240b is a processing unit configured to calculate the SNR of the second voice signal. The following describes exemplary processing at the signal level calculation unit 240b.

The signal level calculation unit 240b divides the second voice signal into a plurality of frames each having a predetermined length, and calculates the power $S_2(n)$ for each frame. Similarly to the signal level calculation unit 140b, the signal level calculation unit 240b calculates the power $S_2(n)$ based on Expression (2).

The signal level calculation unit 240b determines the existence of a speech interval based on the power $S_2(n)$. For example, the signal level calculation unit 240b determines that speech exists in the n-th frame when Condition 4 is satisfied. When Condition 4 is not satisfied, the signal level calculation unit 240b determines that no speech exists in the n-th frame.

$$S_2(n) > TH1 \tag{Condition 4}$$

The signal level calculation unit 240b updates a noise level $N_2(n)$ based on the existence of speech. Specifically, when speech exists, the signal level calculation unit 240b updates the noise level $N_2(n)$ based on Expression (8). When no speech exists, the signal level calculation unit 240b updates the noise level $N_2(n)$ based on Expression (9). In Expression (8), $COF_2$ represents a forgetting coefficient for calculating a long-term power average. For example, $COF_2$ is "0.9".

$$N_2(n) = N_2(n-1) \times COF_2 + S_2(n) \times (1 - COF_2) \tag{8}$$

$$N_2(n) = N_2(n-1) \tag{9}$$

The signal level calculation unit 240b calculates $SNR_2(n)$ from the difference between the power $S_2(n)$ and the noise level $N_2(n)$. Specifically, the signal level calculation unit 240b calculates $SNR_2(n)$ based on Expression (10). The signal level calculation unit 240b outputs $SNR_2(n)$ to the addition unit 250.

$$SNR_2(n) = S_2(n) - N_2(n) \tag{10}$$

The addition unit 250 is a processing unit configured to add $SNR_1(n)$ and $SNR_2(n)$. For example, the addition unit 250 calculates the sum $SNR(n)$ of $SNR_1(n)$ and $SNR_2(n)$ based on Expression (11). The addition unit 250 outputs the sum $SNR(n)$ to the evaluation unit 260.

$$SNR(n)=SNR_1(n)+SNR_2(n) \qquad (11)$$

The evaluation unit 260 is a processing unit configured to calculate a frequency that the sum SNR(n) exceeds a threshold TH2, and evaluate the impression of the first voice signal or the second voice signal based on the frequency. The evaluation unit 260 outputs a result of the evaluation to the display unit 270. The following describes exemplary processing at the evaluation unit 260.

The evaluation unit 260 calculates a frequency R(i) based on Expression (12). In Expression (12), i represents the serial number of a unit time, and L represents the frame length of a unit time. For example, the frame length of a unit time is 10 seconds.

[Math 3]

$$R(i) = \frac{1}{L*M} \sum_{n=i*L}^{(i+1)*L-1} M \mid \text{if } SNR(n) > TH2 \qquad (12)$$

The evaluation unit 260 may calculate the frequency R(i) by using Expression (13) in place of Expression (12). For example, the total number of frames in the i-th unit time L is 500.

$R(i)$="the number of frames in which the sum SNR $(n)$ exceeds the threshold $TH2$"/"the total number of frames in the $i$-th unit time $L$" in the $i$-th unit time $L$ \qquad (13)

The evaluation unit 260 evaluates the impression of speech of speaker A by comparing the frequency R(i) with a predetermined threshold. For example, the evaluation unit 260 evaluates the impression of speech of speaker A by using an evaluation table.

FIG. 7 is a diagram illustrating an exemplary evaluation table according to Embodiment 2. As illustrated in FIG. 7, the evaluation unit 260 evaluates the impression of speech of speaker A to be "normal" when the frequency R(i) is "equal to or higher than X1 and lower than X2". The evaluation unit 260 evaluates the impression of speech of speaker A to be "rather bad" when the frequency R(i) is "equal to or higher than X2 and lower than X3". The evaluation unit 260 evaluates the impression of speech of speaker A to be "significantly bad" when the frequency R(i) is "equal to or higher than X3". For example, in FIG. 7, X1, X2, and X3 have a magnitude relation of X1<X2<X3.

The evaluation unit 260 may evaluate the impression of speech of speaker B in a manner same as that for speaker A.

When calculating the frequency R(i), the evaluation unit 260 may exclude any certain interval in advance. In this internal, a continuation time in which the sum SNR(n) exceeds the threshold TH2 is shorter than a predetermined threshold (for example, one seconds). Such an interval includes short speech such as backchannels of "yes", "right", and the like, and thus it is possible to improve the accuracy of impression evaluation by excluding speech in the interval.

The display unit 270 is a display device configured to display a result of the evaluation by the evaluation unit 260. For example, the display unit 270 corresponds to a liquid crystal display or a touch panel.

For example, the acceptance units 210a and 210b, the acquisition units 230a and 230b, the signal level calculation units 240a and 240b, the addition unit 250, and the evaluation unit 260 correspond to a control unit. The control unit may be achieved by, for example, a CPU or an MPU. Alternatively, the control unit may be achieved by a hard wired logic such as an ASIC or an FPGA.

Figure 8:
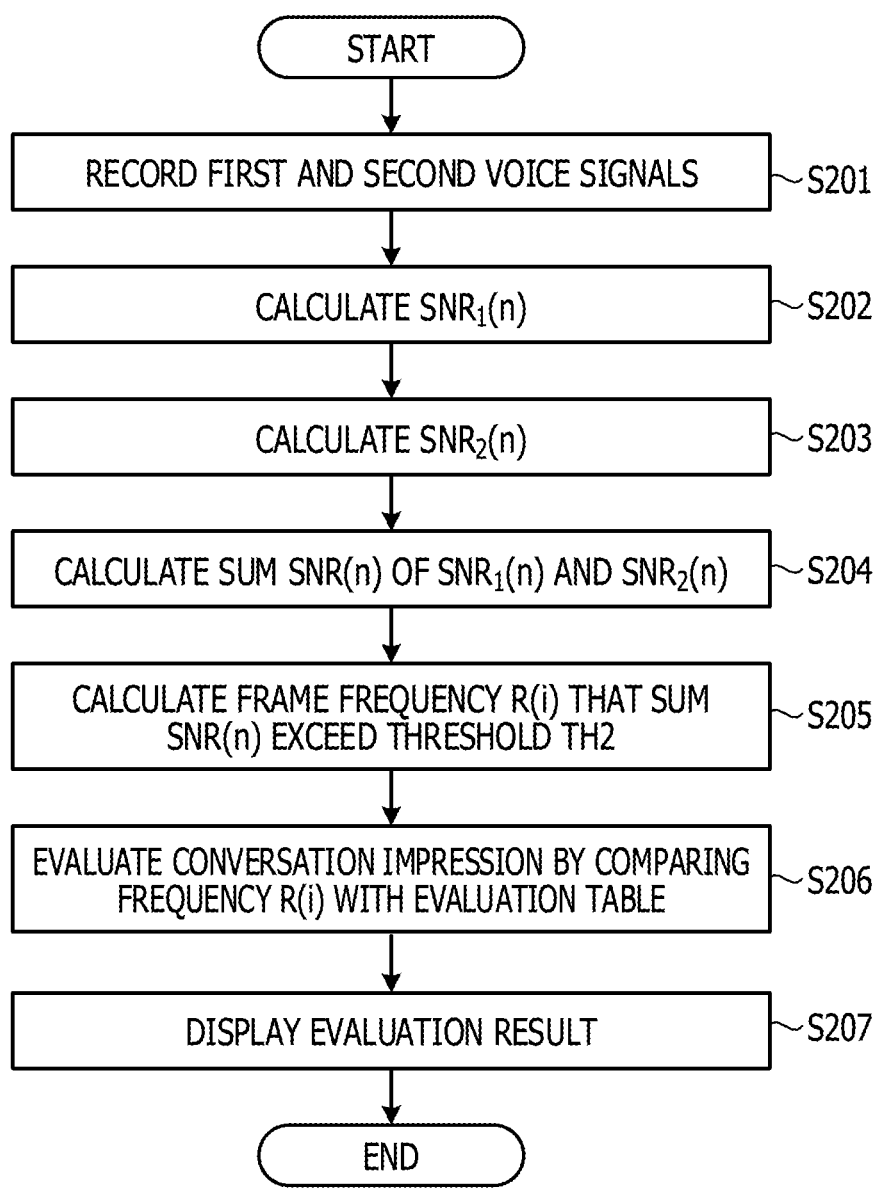
FIG. 8 is a flowchart illustrating the procedure of processing at the evaluation device according to Embodiment 2.

The following describes an exemplary procedure of processing at the evaluation device 200 according to Embodiment 2. FIG. 8 is a flowchart illustrating the procedure of processing at the evaluation device according to Embodiment 2. As illustrated in FIG. 8, the acceptance units 210a and 210b of the evaluation device 200 record the first and second voice signals in the voice buffers 220a and 220b of the storage unit 220 (step S201).

The signal level calculation unit 240a of the evaluation device 200 calculates $SNR_1(n)$ (step S202). The signal level calculation unit 240b of the evaluation device 200 calculates $SNR_2(n)$ (step S203).

The addition unit 250 of the evaluation device 200 calculates the sum SNR(n) of $SNR_1(n)$ and $SNR_2(n)$ (step S204). The evaluation unit 260 of the evaluation device 200 calculates the frequency R(i) that the sum SNR(n) exceeds the threshold TH2 (step S205).

The evaluation unit 260 evaluates the impression of conversation by speaker A (or speaker B) by comparing the frequency R(i) with an evaluation table (step S206). The display unit 270 of the evaluation device 200 displays a result of the evaluation (step S207).

The following describes effects achieved by the evaluation device 200 according to Embodiment 2. The evaluation device 200 specifies the frequency R(i) that the sum SNR(n) of $SNR_1(n)$ of the first voice signal and $SNR_2(n)$ of the second voice signal exceeds the threshold TH2, and evaluates the impression of the conversation based on the frequency R(i). Accordingly, the impression of the conversation is accurately evaluated. For example, it is possible to evaluate that the impression of the conversation is bad when the voice of one of the speakers is large and the voice of the other speaker is small but the frequency that the sum SNR(n) exceeds the threshold TH2 is high. The evaluation device 200 is capable of detecting such evaluation.

The addition unit 250 may calculate an average SNR'(n) by dividing the sum SNR(n) by two. In such a case, the evaluation unit 260 specifies a frequency that the average SNR'(n) exceeds a threshold TH2', and evaluates the impression of the first voice signal or the second voice signal based on the specified frequency.

When performing the frequency calculation, the evaluation unit 260 may exclude predetermined durations at start and end of a speech interval. For example, the evaluation unit 260 specifies a frequency that the sum SNR(n) or the average SNR'(n) exceeds a predetermined threshold in a time slot between a first time a predetermined time after the time of start of a speech interval and a second time a predetermined time before the time of end of the speech interval.

Embodiment 3

Figure 9:
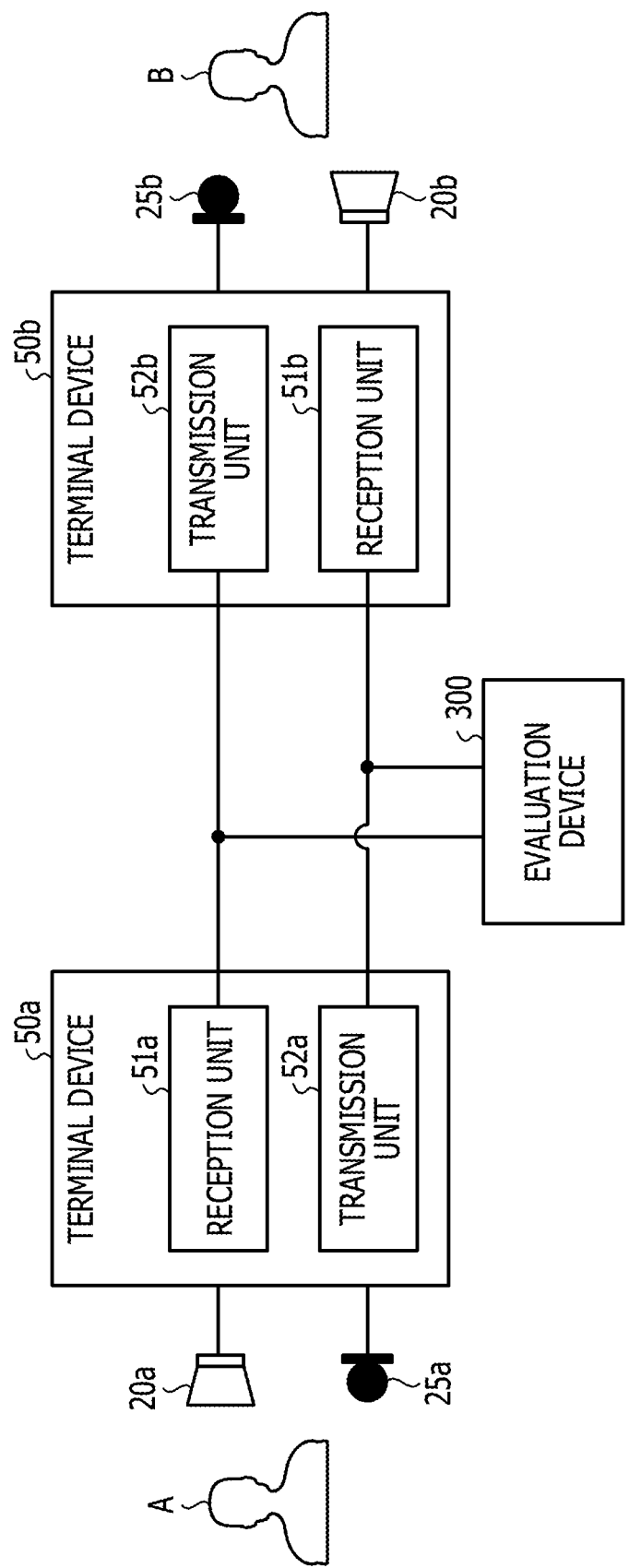
FIG. 9 is a diagram illustrating an exemplary system according to Embodiment 3.

FIG. 9 is a diagram illustrating an exemplary system according to Embodiment 3. As illustrated in FIG. 9, this system includes the terminal device 50a, the terminal device 50b, and an evaluation device 300. The terminal device 50a, the terminal device 50b, and the evaluation device 300 are mutually coupled. Embodiment 3 describes an example in which speaker A is an operator, and speaker B is a customer.

Description of the terminal devices 50a and 50b is same as that of the terminal devices 50a and 50b in Embodiment 1.

The evaluation device 300 is a device configured to acquire the first and second voice signals and evaluate the impression of conversation between speakers A and B based on the first and second voice signals.

Figure 10:
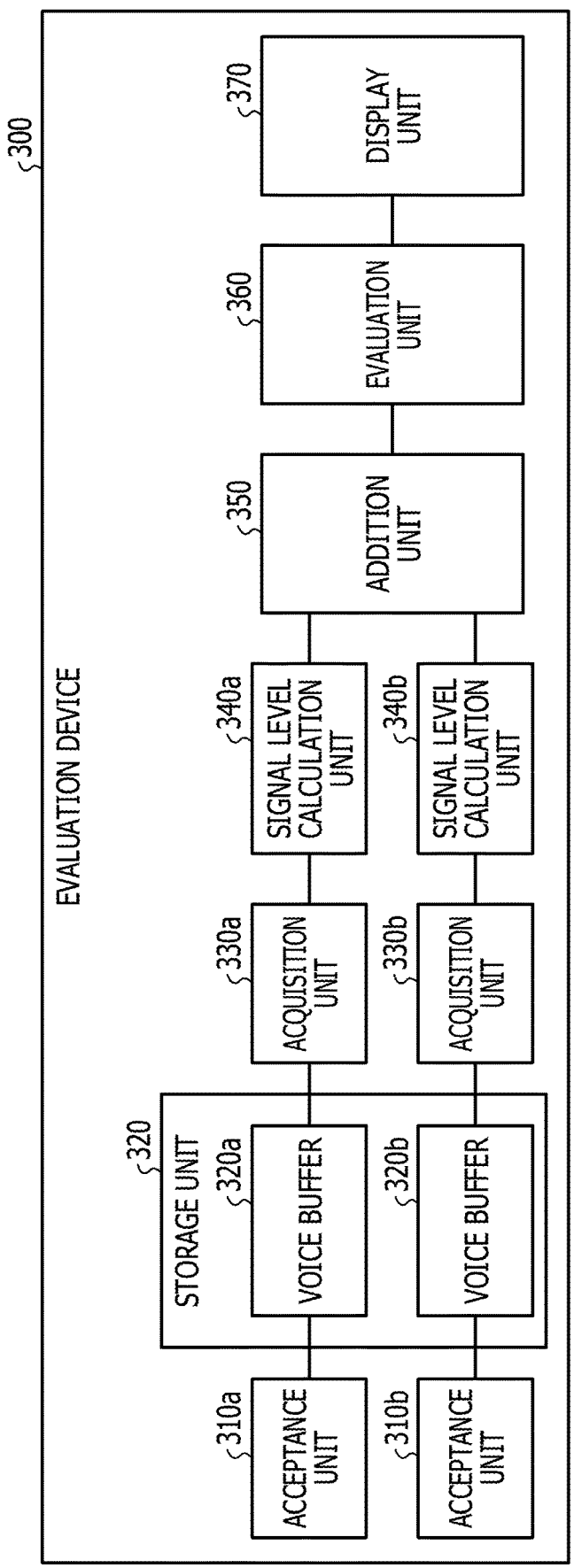
FIG. 10 is a functional block diagram illustrating the configuration of an evaluation device according to Embodiment 3.

FIG. 10 is a functional block diagram illustrating the configuration of the evaluation device according to Embodiment 3. As illustrated in FIG. 10, the evaluation device 300 includes acceptance units 310a and 310b, a storage unit 320, acquisition units 330a and 330b, and signal level calculation units 340a and 340b. The evaluation device 300 includes an addition unit 350, an evaluation unit 360, and a display unit 370.

The acceptance unit 310a is a processing unit configured to accept the first voice signal from the terminal device 50a. The acceptance unit 310a registers the first voice signal to a voice buffer 320a of the storage unit 320.

The acceptance unit 310b is a processing unit configured to accept the second voice signal from the terminal device 50b. The acceptance unit 310b registers the second voice signal to a voice buffer 320b of the storage unit 320.

The storage unit 320 includes the voice buffer 320a and the voice buffer 320b. The storage unit 320 corresponds to a semiconductor memory element such as a RAM, a ROM, or a flash memory, or a storage device such as a HDD.

The voice buffer 320a is a buffer configured to store the first voice signal. The voice buffer 320b is a buffer configured to store the second voice signal.

The acquisition unit 330a is a processing unit configured to acquire the first voice signal stored in the voice buffer 320a and output the acquired first voice signal to the signal level calculation unit 340a.

The acquisition unit 330b is a processing unit configured to acquire the second voice signal stored in the voice buffer 320b and output the acquired second voice signal to the signal level calculation unit 340b.

The signal level calculation unit 340a is a processing unit configured to calculate the value of autocorrelation of the first voice signal. For example, the signal level calculation unit 340a calculates the autocorrelation of the first voice signal, and calculates a maximum autocorrelation value $AC_1(n)$ at a shift amount in a predetermined range. The signal level calculation unit 340a calculates the autocorrelation value $AC_1(n)$ based on Expression (14). In Expression (14), $C_1(t)$ represents the value of the first voice signal at time t, and j represents the shift amount.

[Math 4]

$$AC_1(n) = \max_{j=1 \sim K} \left\{ \sum_{t=n*M}^{(n+1)*M-1} C_1(t) \cdot C_1(t+j) \right\} \quad (14)$$

Figure 11:
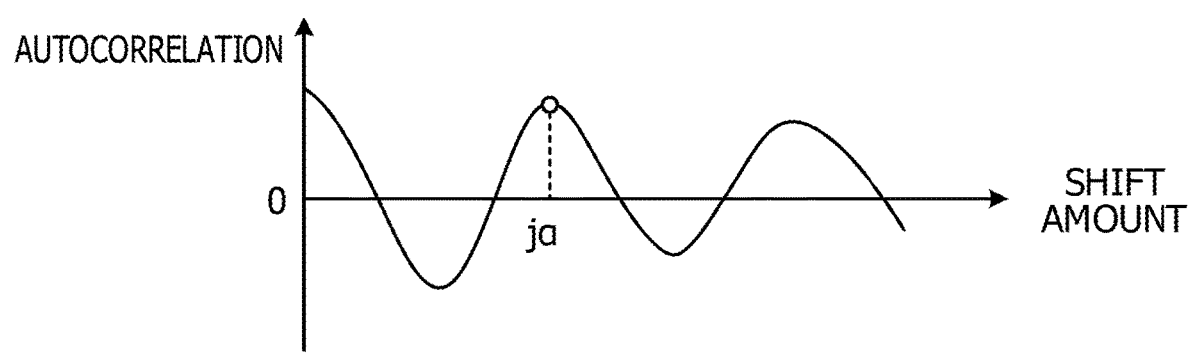
FIG. 11 is a diagram illustrating the relation between autocorrelation and a shift amount.

FIG. 11 is a diagram illustrating the relation between the autocorrelation and the shift amount. In FIG. 11, the vertical axis represents the value of the autocorrelation, and the horizontal axis represents the shift amount. In the example illustrated in FIG. 11, the autocorrelation takes the maximum value (autocorrelation value $AC_1(n)$) when the shift amount is $j_\alpha$. The signal level calculation unit 340a outputs the autocorrelation value $AC_1(n)$ to the addition unit 350.

The signal level calculation unit 340b is a processing unit configured to calculate the value of autocorrelation of the second voice signal. For example, the signal level calculation unit 340b calculates the autocorrelation of the second voice signal, and calculates a maximum autocorrelation value $AC_2(n)$ at a shift amount in a predetermined range. The signal level calculation unit 340b calculates the autocorrelation value $AC_2(n)$ based on Expression (15). In Expression (15), $C_2(t)$ represents the value of the second voice signal at time t, and j represents the shift amount.

[Math 5]

$$AC_2(n) = \max_{j=1 \sim K} \left\{ \sum_{t=n*M}^{(n+1)*M-1} C_2(t) \cdot C_2(t+j) \right\} \quad (15)$$

The signal level calculation unit 340b outputs the autocorrelation value $AC_2(n)$ to the addition unit 350.

The addition unit 350 is a processing unit configured to perform weighting on the autocorrelation value $AC_1(n)$ and the autocorrelation value $AC_2(n)$ and then add the autocorrelation value $AC_1(n)$ and the autocorrelation value $AC_2(n)$. For example, the addition unit 350 calculates a sum $AC(n)$ based on Expression (16). The addition unit 350 outputs the sum $AC(n)$ to the evaluation unit 360.

$$AC(n) = k_1 \times AC_1(n) + k_2 \times AC_2(n) \quad (16)$$

In Expression (16), $k_1$ and $k_2$ represent weighting coefficients. For example, $k_1$ is 1.5 and $k_2$ is 0.5.

The evaluation unit 360 is a processing unit configured to calculate a frequency that the sum $AC(n)$ exceeds a threshold TH3 and evaluate the impression of the first voice signal or the second voice signal based on the frequency. The evaluation unit 360 outputs a result of the evaluation to the display unit 370. The following describes exemplary processing at the evaluation unit 360.

The evaluation unit 360 calculates the frequency $R(i)$ based on Expression (17). In Expression (17), i represents the serial number of a unit time, and L represents the frame length of a unit time. For example, the frame length of a unit time is 10 seconds.

[Math 6]

$$R(i) = \frac{1}{L*M} \sum_{n=i*L}^{(i+1)*L-1} M \mid \text{if } AC(n) > TH3 \quad (17)$$

The evaluation unit 360 may calculate the frequency $R(i)$ by using Expression (18) in place of Expression (17). For example, the total number of frames in the i-th unit time L is 500.

$R(i)$="the number of frames in which the sum $AC(n)$ exceeds the threshold $TH3$"/"the total number of frames in the i-th unit time $L$" in the i-th unit time $L$ (18)

The evaluation unit 360 evaluates the impression of speech of speaker A by comparing the frequency $R(i)$ with a predetermined threshold. For example, the evaluation unit 360 evaluates the impression of speech of speaker A by using an evaluation table. For example, the evaluation table corresponds to the evaluation table described with reference to FIG. 7.

The evaluation unit 260 may evaluate the impression of speech of speaker B in a manner same as that of speaker A.

When calculating the frequency $R(i)$, the evaluation unit 360 may exclude any certain interval in advance. In this interval, a continuation time in which the sum $AC(n)$ exceeds the threshold TH3 is shorter than a predetermined threshold (for example, one second). Such an interval includes short speech such as backchannels of "yes", "right", and the like, and thus it is possible to improve the accuracy of impression evaluation by excluding speech in the interval.

The display unit 370 is a display device configured to display a result of the evaluation by the evaluation unit 360. For example, the display unit 370 corresponds to a liquid crystal display or a touch panel.

For example, the acceptance units 310a and 310b, the acquisition units 330a and 330b, the signal level calculation units 340a and 340b, the addition unit 350, and the evaluation unit 360 correspond to a control unit. The control unit may be achieved by, for example, a CPU or a MPU. Alternatively, the control unit may be achieved by a hard wired logic such as an ASIC or an FPGA.

Figure 12:
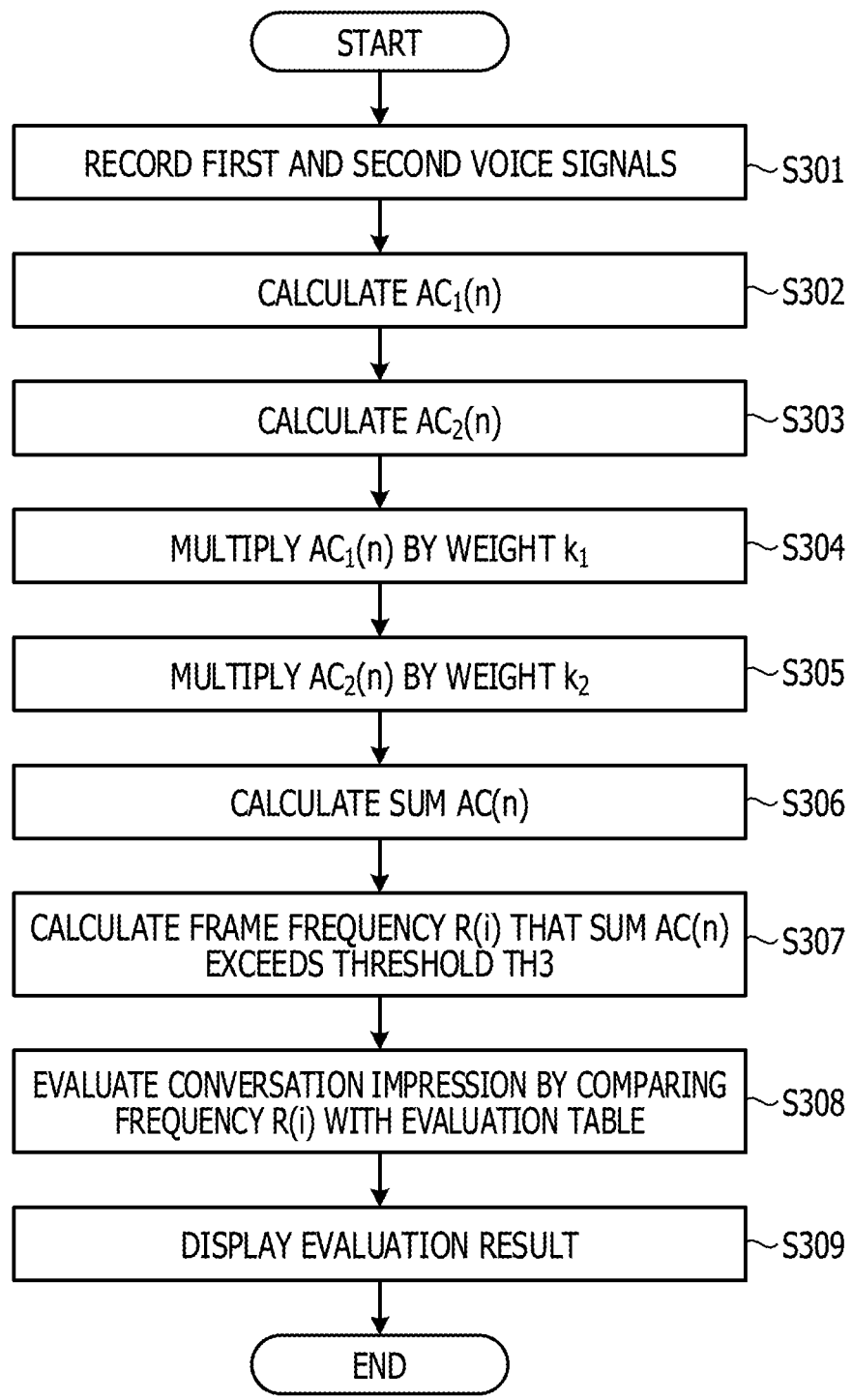
FIG. 12 is a flowchart illustrating the procedure of processing at the evaluation device according to Embodiment 3.

The following describes an exemplary procedure of processing at the evaluation device 300 according to Embodiment 3. FIG. 12 is a flowchart illustrating the procedure of processing at the evaluation device according to Embodiment 3. As illustrated in FIG. 12, the acceptance units 310a and 310b of the evaluation device 300 record the first and second voice signals in the voice buffers 320a and 320b of the storage unit 320 (step S301).

The signal level calculation unit 340a of the evaluation device 300 calculates $AC_1(n)$ (step S302). The signal level calculation unit 340b of the evaluation device 300 calculates $AC_2(n)$ (step S303).

The addition unit 350 of the evaluation device 300 multiplies $AC_1(n)$ by the weight $k_1$ (step S304). The addition unit 350 multiplies $AC_2(n)$ by the weight $k_2$ (step S305). The addition unit 350 calculates the sum $AC(n)$ (step S306).

The evaluation unit 360 of the evaluation device 300 calculates the frequency R(i) that the sum AC(n) exceeds the threshold TH3 (step S307).

The evaluation unit 360 evaluates the impression of conversation by speaker A (or speaker B) by comparing the frequency R(i) with an evaluation table (step S308). The display unit 370 of the evaluation device 300 displays a result of the evaluation (step S309).

The following describes effects achieved by the evaluation device 300 according to Embodiment 3. The evaluation device 300 specifies the frequency R(i) that the sum AC(n) of $AC_1(n)$ of the first voice signal and $AC_2(n)$ of the second voice signal exceeds the threshold TH3, and evaluates the impression of the conversation based on the frequency R(i). Accordingly, the impression of the conversation is accurately evaluated. For example, it is possible to evaluate that the impression of the conversation is bad when the voice of one of the speakers is large and the voice of the other speaker is small but the frequency that the sum AC(n) exceeds the threshold TH3 is high. The evaluation device 300 is capable of detecting such evaluation.

When the weight $k_1$ of the autocorrelation value $AC_1(n)$ for the first voice signal of speaker A (operator) is larger than the weight $k_2$ of the autocorrelation value $AC_2(n)$ for the second voice signal of speaker B (customer), effects as follows are obtained. Specifically, it is possible to perform impression evaluation more focused on the influence of interruption of the voice of the customer by the operator than on the influence of interruption of the voice of the operator by the customer. Accordingly, it is expected to effectively utilize the evaluation in handling training of the operator.

The addition unit 350 may calculate an average AC'(n) by dividing the sum AC(n) by two. In such a case, the evaluation unit 360 specifies a frequency that the average AC'(n) exceeds a threshold TH3', and evaluates the impression of the first voice signal or the second voice signal based on the specified frequency.

Figure 13:
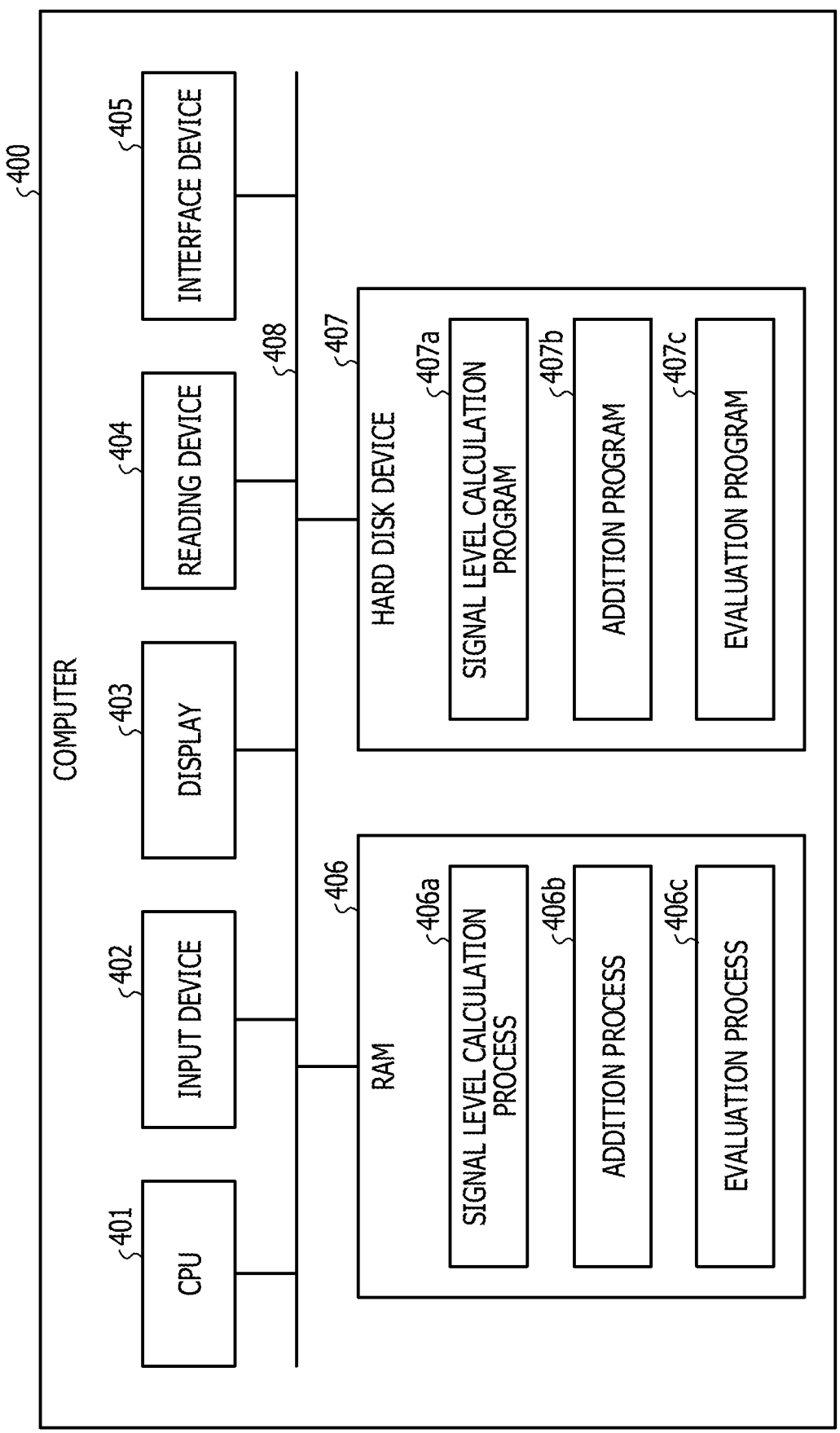
FIG. 13 is a diagram illustrating an exemplary hardware configuration of a computer configured to achieve functions same as those of an evaluation device.
Figure 14:
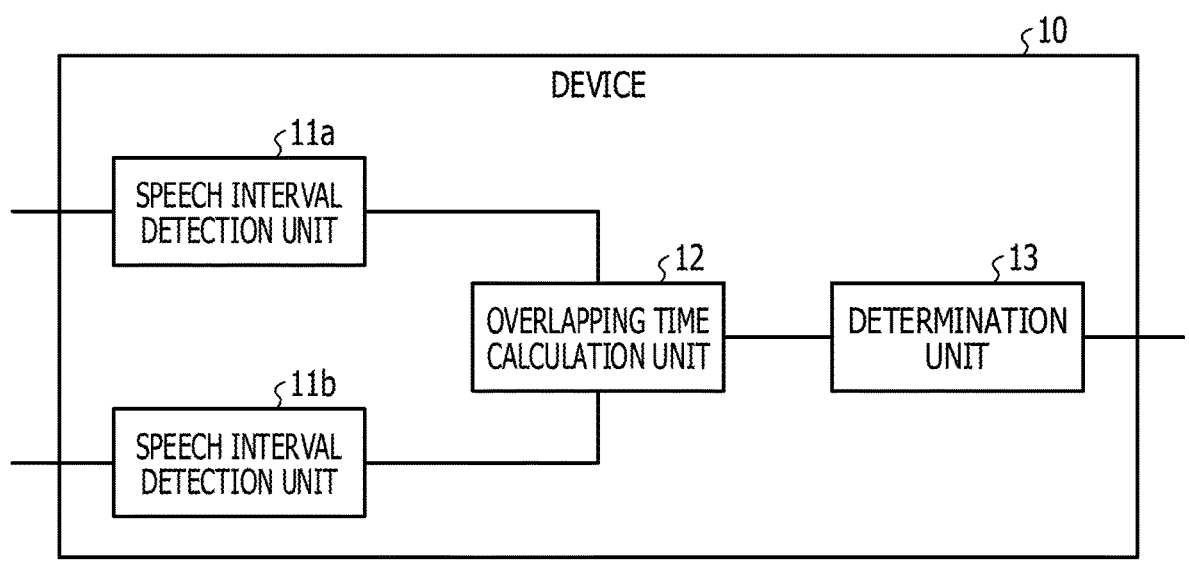
FIG. 14 is a diagram for description of an exemplary conventional technology.
Figure 15:
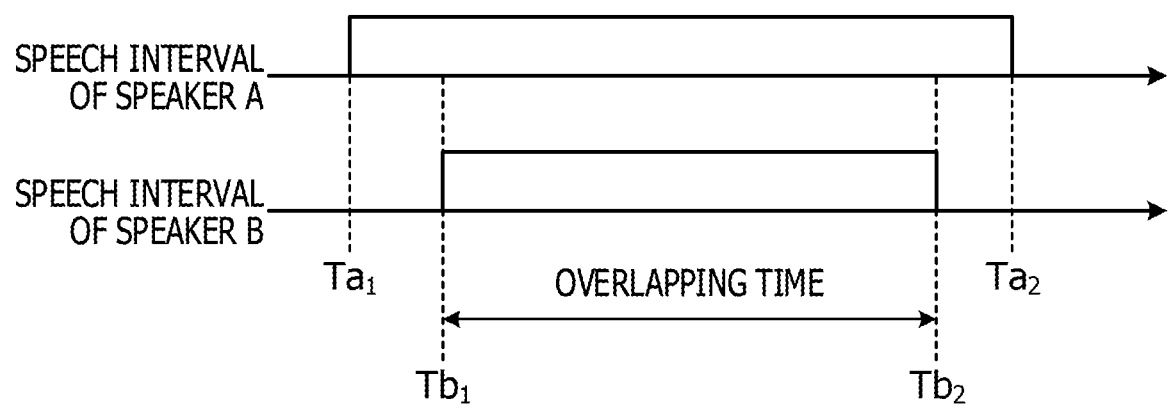
FIG. 15 is a diagram for description of processing at an overlapping time calculation unit.

The following describes an exemplary hardware configuration of a computer configured to achieve functions same as those of the evaluation device 100 (200, 300) described above in the embodiments. FIG. 13 is a diagram illustrating an exemplary hardware configuration of the computer configured to achieve the functions same as those of the evaluation device.

As illustrated in FIG. 13, a computer 400 includes a CPU 401 configured to execute various kinds of arithmetic processing, an input device 402 configured to accept inputting of data from a user, and a display 403. The computer 400 also includes a reading device 404 configured to read a computer program or the like from a storage medium, and an interface device 405 configured to communicate data with an external device. The computer 400 also includes a RAM 406 configured to temporarily store various kinds of information, and a hard disk device 407. The devices 401 to 407 are coupled with a bus 408.

The hard disk device 407 includes a signal level calculation program 407a, an addition program 407b, and an evaluation program 407c. The CPU 401 reads and loads the signal level calculation program 407a, the addition program 407b, and the evaluation program 407c onto the RAM 406.

The signal level calculation program 407a functions as a signal level calculation process 406a. The addition program 407b functions as an addition process 406b. The evaluation program 407c functions as an evaluation process 406c.

Processing at the signal level calculation process 406a corresponds to the processing at the signal level calculation units 140a and 140b (240a and 240b; 340a and 340b). Processing at the addition process 406b corresponds to the processing at the addition unit 150 (250, 350). Processing at the evaluation process 406c corresponds to the processing at the evaluation unit 160 (260, 360).

The programs 407a to 407c do not necessarily have to be stored in the hard disk device 407 from the start. For example, each program is stored in a "portable physical medium" to be inserted into the computer 400, such as a flexible disk (FD), a CD-ROM, a DVD disk, a magneto-optical disc, or an IC card. Then, the programs 407a to 407c may be each read and executed by the computer 400.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
specify a first signal level of a first voice signal;
specify a second signal level of a second voice signal;
execute evaluation of at least one of the first voice signal and the second voice signal based on at least one of a sum of the first signal level and the second signal level and an average of the first signal level and the second signal level;
specify a frequency that at least one of the sum and the average exceeds a threshold; and execute the evaluation on impressions of at least one of the first voice signal and the second voice signal based on the specified frequency.

2. The information processing apparatus according to claim 1, wherein the processor is configured to:
specify a ratio of the first signal level and the second signal level; and
execute the evaluation on impressions of at least one of the first voice signal and the second voice signal based on the specified ratio.

3. The information processing apparatus according to claim 1, wherein
the processor is configured to:
specify a time period for which at least one of the sum and the average continuously exceeds a threshold; and
execute the evaluation on impressions of at least one of the first voice signal and the second voice signal based on the specified time period.

4. The information processing apparatus according to claim 1, wherein
the processor is configured to specify the frequency that at least one of the sum and the average exceeds the threshold in a duration excluding a time slot, the time period being shorter than a certain time length in the time slot.

5. The information processing apparatus according to claim 1, wherein
the processor is configured to specify the frequency that at least one of the sum and the average exceeds the threshold in a time slot between a first time a certain time after a time of start of a speech interval and a second time a certain time before a time of end of the speech interval.

6. The information processing apparatus according to claim 1, wherein
the processor is configured to:
specify the power of the first voice signal as the first signal level; and
specify the power of the second voice signal as the second signal level.

7. The information processing apparatus according to claim 1, wherein
the processor is configured to
specify a signal to noise ratio of the first voice signal as the first signal level; and
specify a signal to noise ratio of the second voice signal as the second signal level.

8. The information processing apparatus according to claim 1, wherein
the processor is configured to:
specify a value of autocorrelation of the first voice signal as the first signal level; and
specify a value of autocorrelation of the second voice signal as the second signal level.

9. The information processing apparatus according to claim 1, wherein
the processor is configured to:
multiply the first signal level by a first coefficient;
multiply the second signal level by a second coefficient different from the first coefficient; and
specify at least one of the sum and the average based on the multiplied first signal level and the multiplied second signal level.

10. The information processing apparatus according to claim 1, wherein the evaluation evaluates whether a first speaker of the first voice signal interrupts speech of a second speaker of the second voice signal.

11. A method executed by a computer, the method comprising:
specifying a first signal level of a first voice signal;
specifying a second signal level of a second voice signal;
executing evaluation of at least one of the first voice signal and the second voice signal based on at least one of a sum of the first signal level and the second signal level and an average of the first signal level and the second signal level;
specifying a frequency that at least one of the sum and the average exceeds a threshold; and
executing the evaluation on impressions of at least one of the first voice signal and the second voice signal based on the specified frequency.

12. The method according to claim 11, further comprising:
specifying a ratio of the first signal level and the second signal level; and
executing the evaluation on impressions of at least one of the first voice signal and the second voice signal based on the specified ratio.

13. The method according to claim 11, further comprising:
specifying a time period for which at least one of the sum and the average continuously exceeds a threshold; and
executing the evaluation on impressions of at least one of the first voice signal and the second voice signal based on the specified time period.

14. The method according to claim 11, further comprising:
specifying the frequency that at least one of the sum and the average exceeds the threshold in a duration excluding a time slot, the time period being shorter than a certain time length in the time slot.

15. A non-transitory computer-readable storage medium storing a program that causes an information processing apparatus to execute a process, the process comprising:
specifying a first signal level of a first voice signal;
specifying a second signal level of a second voice signal;
executing evaluation of at least one of the first voice signal and the second voice signal based on at least one of a sum of the first signal level and the second signal level and an average of the first signal level and the second signal level;
specifying a frequency that at least one of the sum and the average exceeds a threshold; and
executing the evaluation on impressions of at least one of the first voice signal and the second voice signal based on the specified frequency.

16. The non-transitory computer-readable storage medium according to claim 15, the process further comprising:
specifying a ratio of the first signal level and the second signal level; and
executing the evaluation on impressions of at least one of the first voice signal and the second voice signal based on the specified ratio.

17. The non-transitory computer-readable storage medium according to claim 15, the process further comprising:
specifying a time period for which at least one of the sum and the average continuously exceeds a threshold; and executing the evaluation on impressions of at least one of the first voice signal and the second voice signal based on the specified time period.

\* \* \* \* \*